United States Patent Office 3,171,801
Patented Mar. 2, 1965

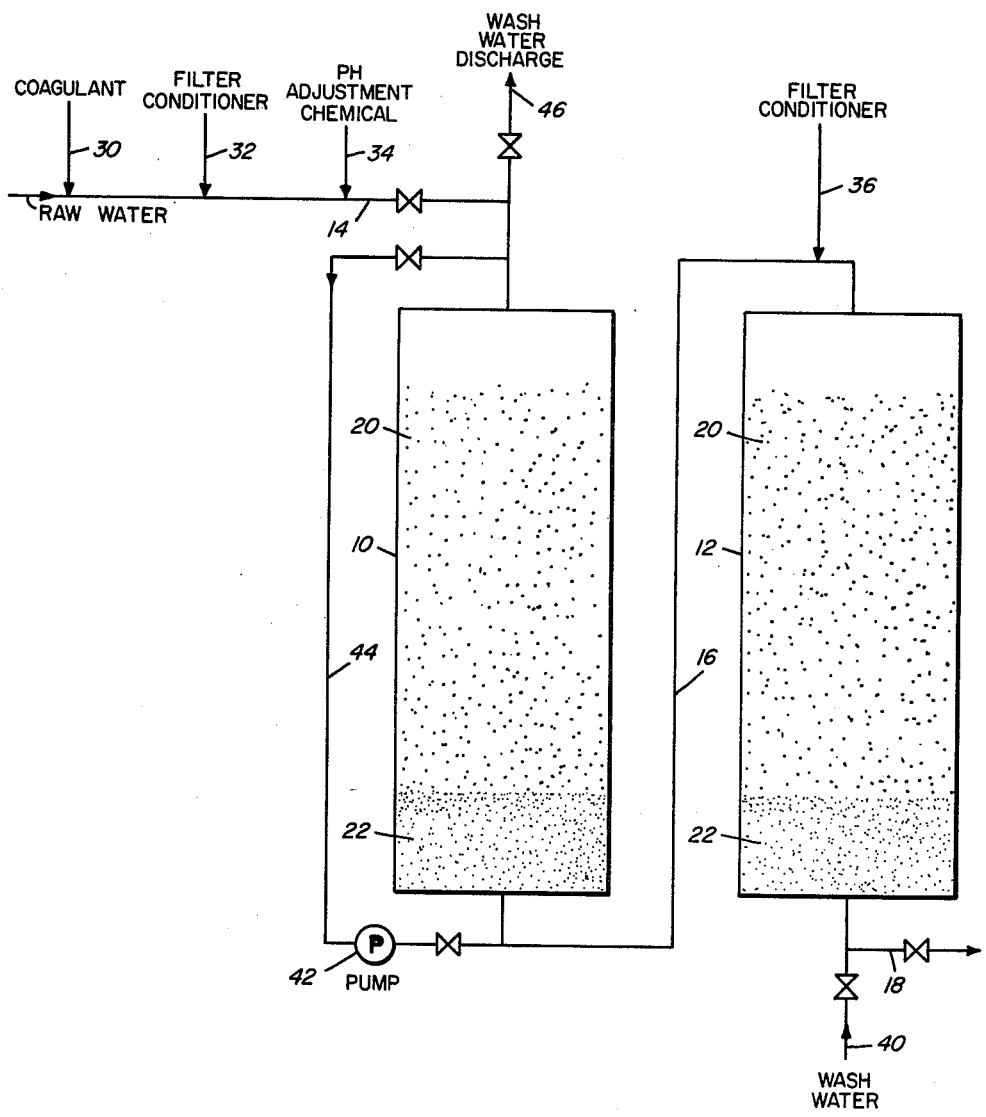

3,171,801
PROCESS FOR CLARIFYING WATER
Archie H. Rice, Walter R. Conley, and Russell L. Culp, Corvallis, Oreg., assignors to General Services Company, a corporation of Oregon
Filed Oct. 29, 1962, Ser. No. 233,626
11 Claims. (Cl. 210—52)

This invention relates to a process for removing turbidity, hardness, iron, manganese, and other materials from water and other liquids.

In the present state of the art, turbid water is usually coagulated with aluminum sulfate or ferric sulfate. The water is then passed through flocculators to enlarge the floc and then into settling basins where some of the suspended matter is removed by settling. The settling basins are designed to remove most of the suspended matter. Following the settling basins, the water is passed through filters.

Some attempts have been made at eliminating the flocculators and settling basins. A class of filters known as diatomaceous earth filters has been used successfully without settling basins or flocculators as long as the applied turbidity is not too high—generally, no more than 50 to 60 p.p.m. When the turbidity of the raw water is above 50 to 60 p.p.m., the effluent water is of poor quality and the filter runs are so short that the process is impractical.

A number of plants have been able to eliminate the flocculators successfully, but settling basins have been necessary when treating high turbidity raw water.

A few plants have managed to treat raw water with turbidity of about 300 p.p.m. to give a satisfactory effluent by means of filters built of fine sand and coarse anthracite while using alum as a coagulant and polyelectrolytes as filter conditioners. However, filter runs have been so short that the process is not as economical as desired for a turbidity of over about 100 p.p.m.

It is the object of this invention to provide a process which will eliminate the flocculators, settling tanks, and contact tanks in the removal of suspended matter from water.

Still another object is to remove algae and other organisms from water by filtration without the use of settling basins, flocculators, or contact tanks.

Yet another object is to improve the control of coagulant and filter conditioning chemicals by eliminating the large time lag that occurs in the settling tanks, flocculators, and contact tanks.

An additional object is to reduce the waste disposal problem caused by periodic cleaning of settling tanks, flocculators, and contact tanks. The insoluble materials will be flushed from the system into the receiving stream at frequent intervals so that the diluting power of the stream is more efficiently used than is the case when large sludge volumes are cleaned from the settling tanks at infrequent intervals.

Another object is to eliminate the labor and expense of cleaning settling basins, flocculators, and contact tanks. In the invention, all wastes would be removed by filter back-washing.

Other objects and advantages will become apparent from the following description of the invention and the accompanying drawing wherein there is shown schematically in FIG. 1 a system for performing the method of the invention.

The process of the present invention provides a method of removing suspended matter from high turbidity raw water without flocculation or settling basins, except that the latter may be desirable to remove easily settleable material so as to reserve the capacity of the filter beds for the suspended materials carried in the water. In accordance with the invention a series of filters are provided, each comprising a bed made up of a layer of coarse particles and a layer of finer particles. The flow is arranged through each filter in the direction from the coarse to the fine particles. A coagulant is added to the water to be treated, the pH adjusted to within desired limits and a filter conditioner, as defined hereinafter, added to the water immediately prior to its entry into the first filter. The water passing the first filter is then directed in series to the additional filter or filters and an additional amount of filter conditioner added to the water just prior to its introduction to each such succeeding filter. The effluent water from the second or succeeding filters will ordinarily be satisfactorily clarified.

For the purpose of this application, the following terms are defined:

(1) A coagulant is a material which will cause the suspended particles in water to floc or to be altered so that they can be removed efficiently by filtration. The particles may be enlarged in size by the coagulant or they may be adsorbed, absorbed, or enmeshed in the precipitate formed by the coagulant. Suitable coagulants include aluminum sulfate, ferric sulfate, ferrous sulfate, ferric chloride, and various organic polymers.

(2) A filter conditioner is a material which will assist the filter in removing the coagulated materials from water. The filter conditioner enables the filter to remove and retain a larger amount of suspended matter than is possible without the condittioner. Specific materials which are effective are Separan NP–10, a polyacrylamide made by Dow Chemical Co.; Hagan Coagulant Aid #2, a polysaccharide made by Hagan Chemicals and Controls, Inc.; Superfloc, a polyacrylamide made by American Cyanamid Company; and activated silica. Other polyelectrolytes may also be effective.

Separan NP–10 is reported to have a molecular weight of approximately one million and is represented by the formula:

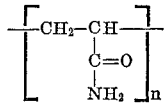

Separan NP–10 is formed by the polymerization of acrylamide. Because of the preponderance of amide groups, the polyacrylamide is essentially nonionic in solution although a small amount of the amide groups are usually hydrolyzed to anionic carboxyl groupings. It is a white, free flowing, amorphous solid with a bulk density of 0.55 gram per cubic centimeter. It softens at 220–230° C. and decomposition is evident at 270° C. It is rapidly wetted by water and is soluble in water in all proportions.

Referring to FIG. 1, the filter system of the invention comprises at least two filters indicated at 10 and 12. Other similar filters may also be added in series. The turbid water to be clarified is introduced to the top of the filter 10 through a conduit 14 and the effluent from the filter 10 is carried to the top of the filter 12 by a conduit 16. The effluent from the filter 12 may be removed by a conduit 18.

In accordance with the invention each of the filters 10, 12 is comprised of two discrete layers of filter media including an upper layer 20 of relatively coarse particles, and a lower layer 22 of finer particles. The actual range of particle size in any instance may be varied depending upon the nature of the suspended material to be removed. Preferably the particles of the upper layer 20 are of material of lower density than that of the particles of the lower layer 22. The upper layer 20 may be, for example, formed of crushed anthracite coal while the lower layer 22 may be composed of fine sand. The difference in density helps to maintain separation between the layers particularly during backwashing operations.

In accordance with the present invention a coagulant is added, as indicated at 30, to the water to be clarified prior to its entry into the first filter 10 along with a filter conditioner, as indicated at 32. The pH is also adjusted within limits to be described by addition of suitable chemicals as indicated at 34. The water is then passed immediately through the filter 10 and then conducted to the filter 12. Prior to entry of the water into the filter 12 additional filter conditioner is added, as indicated at 36. On occasion it may be desirable to add additional coagulant and pH control chemicals at this point.

The present invention has two important aspects. The first is that water to be clarified is passed through at least two filters each of which is composed of a layer of coarse and a layer of fine media. The other aspect is that filter conditioner is added to the water immediately prior to each filter.

While the desirable size range of the filter media may vary depending upon the nature of the turbidity in the water and the amount thereof, the particles of the coarse layer 20 should be substantially larger in diameter than those of the fine layer 22. The coarse particles may range, for example, from about 0.033 inch to about 0.094 inch. It will be recognized that expressed in U.S. Standard Sieve size these particles are betwen about −8 +20 mesh. Preferably the coarse particles are between about −10 +20 U.S. Sieve size. A highly satisfactory material for use in the layer 20 is anthracite coal. It is a highly satisfactory filter media and is also of relatively low cost. Other materials such as naturally mined graphite of suitable density and hardness may also be used. The coarse layer should preferably have a depth of at least about 18 inches and preferably between 20 and 36 inches.

The layer 22 is preferably formed of a relatively dense material such as silica sand. The particle size should be substantially smaller than the particle size of upper coarse media. The sand may range in size from about 0.04 to 0.01 inch, that is between about −18 +60 U.S. Standard Sieve size, but preferably is between about −30 +40 sieve size. Other satisfactory dense materials will occur to those skilled in the art. The layer 22 should have a depth of at least about 3½ inches and preferably a depth of between about 6 to 12 inches.

Coagulant feed requirements will vary, depending on the nature of the raw water being treated. The correct amount to be added is determined by measuring the turbidity of the final filter effluent at the start of the filter cycle. If the turbidity is too high, the coagulant is increased. If the turbidity is too low, the coagulant is decreased. Coagulant feed will vary from 2 p.p.m. to 300 p.p.m., depending on nature of the liquid being treated.

The filter conditioner requirements will also vary, depending on the nature of the liquid being treated and the filter flow rate. The correct amount to be added is determined by measuring the turbidity of each filter effluent near the end of the filter cycle. If the turbidity is higher than desired, the filter conditioner is increased. If the head loss on the filters is too high, the filter conditioner is decreased. The amount of filter conditioner will usually range from 0.01 p.p.m. to 4 p.p.m. parts by weight depending on the nature of the raw water and the filter flow rate. In the case of Separan NP-10 the preferred amount to be added prior to each filter is between about 0.02 p.p.m. and 1.0 p.p.m. The coagulant aid is preferably added in the form of a dilute aqueous solution. The polyacrylamide and polysaccharide type filter conditioners both are preferably in the form of dilute aqueous solutions containing no more than about 0.5 percent filter conditioner by weight and preferably about 0.1 percent filter conditioner.

Control of pH is quite important. The optimum pH range for each water will vary and will have to be determined by test runs. At pH values above the optimum range poor coagulation is obtained and hence poor clarification and at pH values below the optimum excessive amounts of coagulant aid is required. A pH range in the neighborhood of 6.5 to 7.0 will probably prevail for most waters.

The optimum flow rate through the filters appears to be about five gallons per minute per square foot of filter. At such flow rates the life of filter, that is the period of time for which it can be operated without excessive turbidity appearing in the effluent, is about four times as long as the filter life at a flow rate of ten gallons per minute per square foot. Flow rates below 5 g.p.m. are in general uneconomic in view of equipment requirements.

Preferably two or more filters are placed in series and conditioner added in advance of each filter. It has been found that two filters operating in series can be expected to operate for about three times as long as a single filter before "breakthrough" occurs, that is, before turbidity of more than 0.1 to 0.2 part per million appears in the effluent. With three filters in series the length of filter run is increased by about a factor of five as compared with a single filter.

When utilizing a series of three filters the amount of filter conditioner added in advance of each filter is varied as determined by experiment so that approximately sixty percent of the solids are removed in the first filter, thirty percent in the second filter and ten percent in the third. In the case of two filters the amount is controlled so as to remove approximately seventy-five percent in the first filter and twenty-five percent in the second filter. By removing most of the solids in the initial filter or filters the final filter serves as a "polisher" to assure substantially complete removal of the solids.

Experimental evidence indicates that the first filter acts to change the nature of the material that does pass through into the next filter bed. It is not known what change occurs, but the end result is that the suspended matter is easier to filter without the necessity of using large amounts of filter conditioner. It is our opinion that the first filter acts to increase the size of the suspended particles in a manner similar to that occurring in flocculators and settling basins. In the filter, the particles are forced together as they pass around the filter grains. This forcing action may cause collison of the particles and particle growth similar to that occurring in flocculators.

The same general principles and methods apply to removal of iron and manganese values as apply to turbidity removal, except in most cases, the iron and manganese must be oxidized in order to form insoluble material which can be filtered out.

The usual oxidizing agents will be used such as chlorine, potassium permanganate, chlorine dioxide, oxygen at high pH, etc. The first filter beds increase the speed of oxidation by providing large contact surfaces. The size of the media should be balanced as can be determined by routine tests to achieve optimum oxidation as well as filtration. Contact time ahead of the filters can be eliminated as well as settling tanks and flocculators.

The process is controlled by analysis for iron and manganese, either continuously or by spot samples.

The process of the invention can also be applied to removal of hardness from waters. The same general principles and methods apply to hardness removal as apply to turbidity removal, except that the hardness must first be precipitated by adding prior to the first filter the usual chemicals that are used for this purpose. That is calcium hydroxide, alone or with sodium carbonate. The first filter acts as a contact filter to speed the growth of the calcium carbonate and magnesium hydroxide particles.

Control of the process is attained by analysis for hardness and turbidity in the filter effluents.

After a period of several hours' operation, the filter beds will be filled with material and must be cleaned. This is done by a reverse flow of water through the filters. Clean water from any suitable source is fed upwardly through one bed 12 from a pipe 40. The bed 12 requires a backwash rate of 10 to 20 g.p.m. per square foot. The bed 10 may require a higher rate of backwash—from 20 to 50 g.p.m. per square foot, depending on the size of the media being used. For this purpose, the circulating pump 42 and piping 44 may be used to recirculate a portion of the wash water and increase the rate through the bed 10 without increasing the total amount of water used during the backwash operation. The wash water is discharged from the filter 10 through a conduit 46.

This scheme permits the use of a minimum amount of water to backwash all of the series beds in one operation. Both water and time are saved.

*Example I*

The effectiveness of distributing the filter conditioner is indicated in a series of tests run on water taken from Mary's River, Oregon. This water was mixed with soil taken from the river bank to make a slurry having a turbidity of about 1000 p.p.m. To this slurry 83 p.p.m. of aluminum sulfate were added and the pH adjusted to 6.5. The water was then passed through a series of three filters, the first two of which comprised a bed thirty inches in length of crushed anthracite coal of between −10 +20 mesh. The third filter comprised an upper, twenty-four inch layer of anthracite of −10 +20 mesh and a lower six inch layer of sand of between −30 +40 mesh. In two runs 0.56 p.p.m. of Separan NP–10 polyacrylamide in the form of an aqueous solution containing about 0.01 percent by weight polyacrylamide were added to the turbid water immediately prior to its entry into the first filter. The water was passed through the filters at a rate of five gallons per minute per square foot of filter area. In one run turbid water, i.e. water having more than about 0.1 to 0.2 p.p.m. turbidity, appeared in the effluent of the third filter after a run of only about one hour. In the other run such turbidity did not appear until about one and one half hours after the start of the run.

In a third run the polyacrylamide dosage was split so as to add 0.32 p.p.m. prior to the first filter, 0.08 p.p.m. prior to the second filter and 0.16 p.p.m. prior to the third filter. Conditions were otherwise the same. In this instance, the filter effluent showed no turbidity at the end of five hours run.

A fourth run was made identical to the third except that 0.16 p.p.m. polyacrylamide were added to the turbid water prior to its entrance to the second filter. No turbidity had appeared in the effluent of the third filter at the end of three hours when the run was terminated.

*Example II*

The value of providing a layer of sand and a layer of anthracite in each filter is demonstrated in other tests.

Water from Mary's River, Oregon, was mixed with soil to provide a turbidity of about 500 p.p.m. Such water was passed through two different filter arrangements.

The first arrangement consisted of a series of three filters, the first of which comprised an upper, thirty inch layer of −10 +20 mesh anthracite, and a bottom, three and one-half inch layer of −20 +30 mesh sand. The second filter consisted of an upper, twenty-six inch layer of anthracite and a three and one-half inch bottom layer of −30 +40 mesh sand. The third filter comprised an upper, twenty-four inch layer of −10 +20 mesh anthracite and a lower, six inch layer of −30 +40 mesh sand.

In the second filter arrangement the first two filters each comprised a thirty inch layer of −10 +20 mesh anthracite with no other filtering media. The third filter comprised an upper, twenty four inch layer of −10 +20 mesh anthracite and a lower, six inch layer of −30 +40 mesh sand.

The turbid water in each test was treated with 56 p.p.m. aluminum sulfate and sodium carbonate added to increase the pH to about 6.6. Before adding the water to the first filter 0.2 p.p.m. of Separan NP–10 polyacrylamide was added in 0.01 percent aqueous solution. As the water passed from the first to the second filter an additional 0.05 p.p.m. polyacrylamide were added, and as the water passed to the third filter an additional 0.1 p.p.m. polyacrylamide were added. The water was passed through both sets of filters at the rate of ten gallons per minute per square foot of filter area.

Turbid effluent, that is, turbidity of more than about 0.1 to 0.2 p.p.m., appeared at the discharge of the third filter in the second filter arrangement after 120 minutes of continuous filtering. On the other hand, with the first filter arrangement no turbidity was showing after 160 minutes of continuous filtering at which time the run was terminated. Thus the presence of the sand in each of the filters increased the period of effectiveness of the filters by over thirty percent.

Having illustrated and described a preferred embodiment of the invention, it should be apparent to those skilled in the art that the invention permits of modification in arrangement and detail. We claim as our invention all such modifications as come within the true spirit and scope of the appended claims.

We claim:

1. The method of removing suspended matter from water which comprises the steps of
   (1) providing two filter beds each consisting of a layer of fine filter media of less than 18 mesh and a layer of coarser filter media of less than 8 mesh,
   (2) adding to the water to be treated a coagulant,
   (3) adding to the water to be treated a filter conditioner,
   (4) passing said water through one of said filters in the direction from said coarser to said fine media,
   (5) adding solely additional filter conditioner without adding additional coagulant to said water discharging from said one filter, and
   (6) passing said water through the other of said filters in the direction from said coarser to fine media.

2. The method of removing suspended matter from water which comprises the steps of
   (1) providing two filter beds each consisting of a layer of fine sand of less than 18 mesh and a layer of anthracite particles of substantially larger diameter than said sand but of less than 8 mesh,
   (2) adding to the water to be treated a coagulant,
   (3) adding to the water to be treated a filter conditioner,
   (4) passing said water through one of said filters in the direction from said anthracite to said sand,
   (5) adding solely additional filter conditioner without adding additional coagulant to said water, and (6) passing said water through the other of said filters in the direction from said anthracite to said sand.

3. The method of removing suspended matter from water which comprises the steps of
(1) providing two filter beds each consisting of a layer of fine sand of less than 18 mesh and a layer of anthracite particles of larger diameter than said sand but of less than 8 mesh,
(2) adding to the water to be treated a coagulant,
(3) adding to the water to be treated a filter conditioner comprising a polymer of acrylamide,
(4) passing said water through one of said filters in the direction from said anthracite to said sand,
(5) adding solely additional filter conditioner comprising a polymer of acrylamide to said water without adding additional coagulant, and
(6) passing said water through the other of said filters in the direction from said anthracite to said sand.

4. The method of removing suspended matter from water which comprises the steps of
(1) providing a plurality of at least two filter beds each consisting of a layer of fine sand of less than 18 mesh and a layer of coarser anthracite particles of less than 8 mesh,
(2) adding to the water to be treated a coagulant,
(3) passing said water in series through said filters with the water passing through each filter in the direction from said anthracite to said sand therein,
(4) and the further step consisting of adding a filter conditioner to said water immediately prior to its entry into each filter without adding additional coagulant to said water passing between said filters.

5. The method of removing suspended matter from water which comprises the steps of
(1) providing two filter beds each consisting of a layer of fine sand of a diameter of between about −30 +40 mesh size and a layer of anthracite particles having a diameter of between about −10 +20 mesh size,
(2) adding to the water to be treated a coagulant,
(3) adding to the water to be treated a filter conditioner,
(4) passing said water through one of said filters in the direction from said anthracite to said sand,
(5) adding solely additional filter conditioner without adding additional coagulant to said water, and
(6) passing said water through the other of said filters in the direction from said anthracite to said sand.

6. The method of removing suspended matter from water which comprises the steps of
(1) providing two filter beds each consisting of a layer of fine particles having a diameter of between about −30 +40 mesh sizes and a layer of coarse particles having a diameter of between about −10 +20 mesh size,
(2) adding to the water to be treated a coagulant,
(3) adding to the water to be treated a filter conditioner,
(4) passing said water through one of said filters in the direction from said coarser to said finer particles,
(5) adding solely additional filter conditioner without adding additional coagulant to said water, and
(6) passing said water through the other of said filters in the direction from said coarser to finer particles.

7. The method of removing suspended matter from water which comprises the steps of
(1) providing two filter beds each consisting of a layer of fine sand of less than 18 mesh and a layer of coarser anthracite particles of less than 8 mesh,
(2) adding to the water to be treated a coagulant,
(3) adjusting the pH of said water to within the predetermined range for formation of floc with said coagulant,
(4) adding to said water a filter conditioner comprising a polyelectrolyte,
(5) passing said water through one of said filters in the direction from said anthracite to said sand,
(6) adding solely an additional amount of said filter conditioner without adding additional coagulant to said water, and
(7) passing said water through the other of said filters in the direction from said anthracite to said sand.

8. The method of removing suspended matter from water which comprises the steps of
(1) providing three filter beds each consisting of a layer of fine sand of less than 18 mesh and a layer of coarser anthracite particles of less than 8 mesh,
(2) adding to the water to be treated a coagulant comprising aluminum sulfate,
(3) adding to the water to be treated about 0.32 part per million polyacrylamide,
(4) passing said water through a first one of said filters in the direction from said anthracite to said sand therein,
(5) adding solely 0.08 part per million polyacrylamide to said water emerging from said first filter,
(6) and immediately thereafter without adding additional coagulant passing said water through a second one of said filters in the direction from said anthracite to said sand therein,
(7) adding solely 0.16 part per million polyacrylamide to said water emerging from said second filter,
(8) and immediately thereafter without adding additional coagulant passing said water through the third one of said filters in the direction from said anthracite to said sand therein.

9. The method of removing suspended matter from water which comprises the steps of
(1) providing at least two filter beds each consisting of a layer of fine sand particles having a diameter of between about −30 +40 mesh size, and a layer of anthracite particles having a diameter of between about −10 +20 mesh size,
(2) adding to the water to be treated aluminum sulfate,
(3) adjusting the pH of said water to between 6.5 and 7.0,
(4) passing said water in series through said filters with the water passing through each filter in the direction from said anthracite to said sand therein, and adding solely between about 0.01 to 4 p.p.m. polyacrylamide to said water immediately prior to its entry into each filter.

10. In the method of removing suspended matter from water, the steps comprising
(1) providing two filter beds each consisting of a layer of fine filter media of less than 18 mesh and a layer of coarser filter media of less than 8 mesh,
(2) adding to the water to be treated a coagulant,
(3) adding to the water to be treated a filter conditioner,
(4) passing said water through one of said filters in the direction from said coarser to said fine media,
(5) adding solely additional filter conditioner without adding additional coagulant to said water discharging from said one filter,
(6) passing said water through the other of said filters in the direction of said coarser to said fine media,
(7) terminating the aforesaid steps when the pressure drop through said filters reaches a predetermined amount, and
(8) passing backwash water through said filters in series in the direction opposite to filter flow therethrough so as to remove suspended material collected in said filter beds.

11. The method of claim 10 wherein at least a portion of the backwash water through one of said filters is recirculated through said one filter simultaneously with the normal volume of wash water received at said one filter so as to enhance the velocity of the wash water passing through said one filter.

References Cited by the Examiner

UNITED STATES PATENTS

| | | | |
|---|---|---|---|
| 945,146 | 1/10 | Wilson | 210—82 |
| 2,114,576 | 8/38 | Schinman | 210—42 |
| 2,681,153 | 6/54 | Armbrust | 210—82 |
| 3,067,133 | 12/62 | Conley et al. | 210—42 |

OTHER REFERENCES

Conley et al.: Test Program for Filter Evaluation at Hanford, JAWWA, vol. 52, February 1960, pp. 205–218 (copy in Pat. Off. Library).

Conley et al.: Innovations in Water Clarification, JAWWA, vol. 52, October 1960, pp. 1319–1325 (Library).

Conley: Experience With Anthracite-Sand Filters, JAWWA, vol. 53, December 1961, pp. 1473–1483 (Library).

MORRIS O. WOLK, *Primary Examiner.*